United States Patent [19]

Rice et al.

[11] Patent Number: 4,820,746

[45] Date of Patent: Apr. 11, 1989

[54] RADIATION-CURED RUBBER-BASED PRESSURE-SENSITIVE ADHESIVE

[75] Inventors: Cassandra S. Rice, Long Beach; Yukihiko Sasaki, Claremont; Sebastian S. Plamthottam, Pasadena, all of Calif.

[73] Assignee: Avery International Corporation, Pasadena, Calif.

[21] Appl. No.: 896,127

[22] Filed: Aug. 12, 1986

[51] Int. Cl.[4] .......................... C08J 3/28; C08L 25/10
[52] U.S. Cl. .................................. 522/127; 525/332.6; 525/350
[58] Field of Search ..................... 522/127; 525/332.6, 525/350

[56] References Cited

U.S. PATENT DOCUMENTS

| | | | |
|---|---|---|---|
| 3,843,502 | 10/1974 | Pearson et al. | 522/127 |
| 3,864,229 | 2/1975 | Zapp et al. | 522/127 |
| 3,920,877 | 11/1975 | Barber et al. | 428/345 |
| 4,028,292 | 6/1977 | Korpman | 524/203 |

Primary Examiner—John C. Bleutge
Assistant Examiner—R. Dean, Jr.
Attorney, Agent, or Firm—Christie, Parker & Hale

[57] ABSTRACT

Polythiol crosslinking agents are used in combination with electron beam and/or photoinitiator ultraviolet cure to enhance the high temperature shear properties of rubber-based pressure-sensitive adhesives.

46 Claims, 13 Drawing Sheets

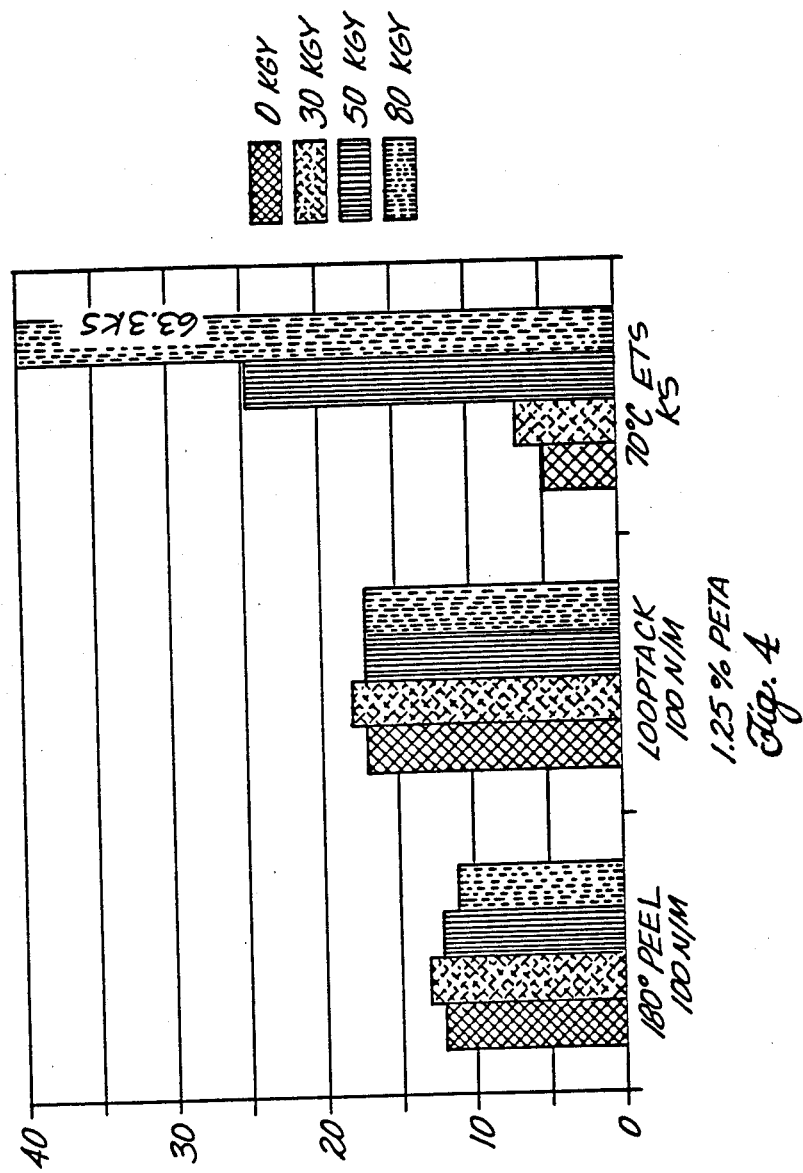

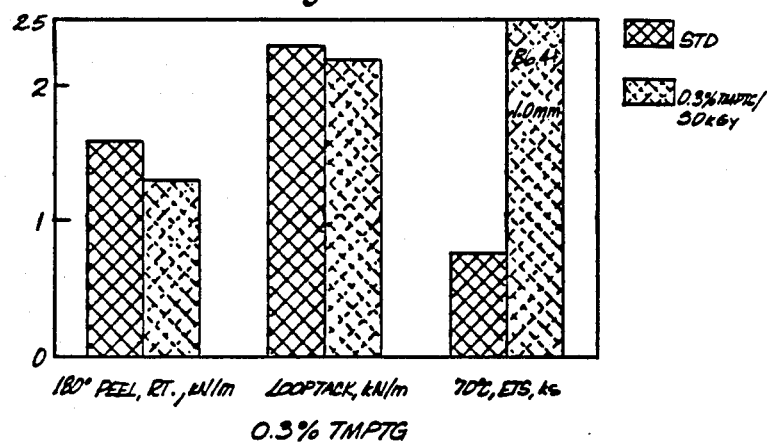
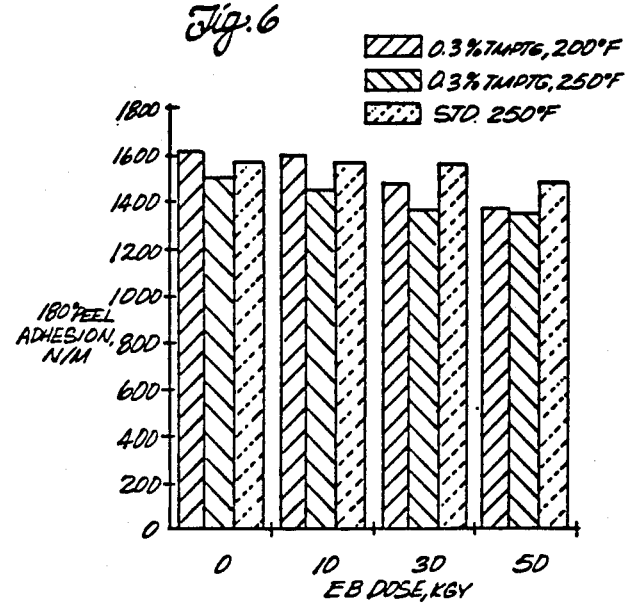

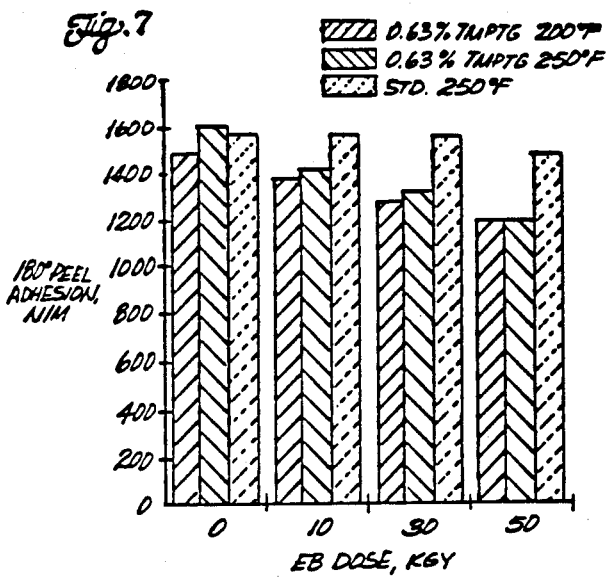
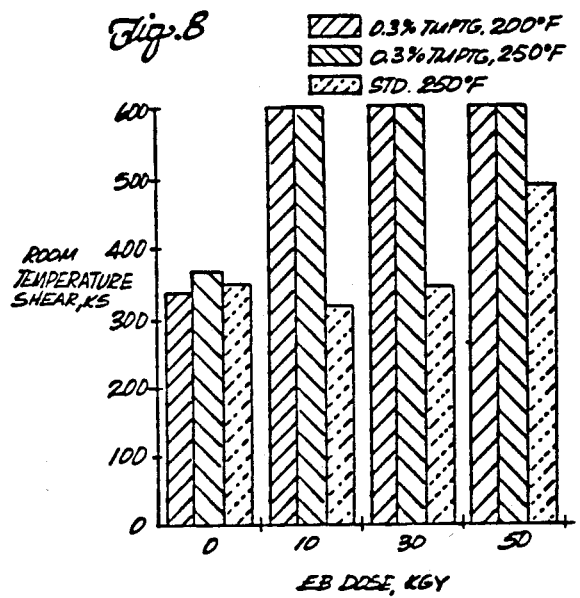

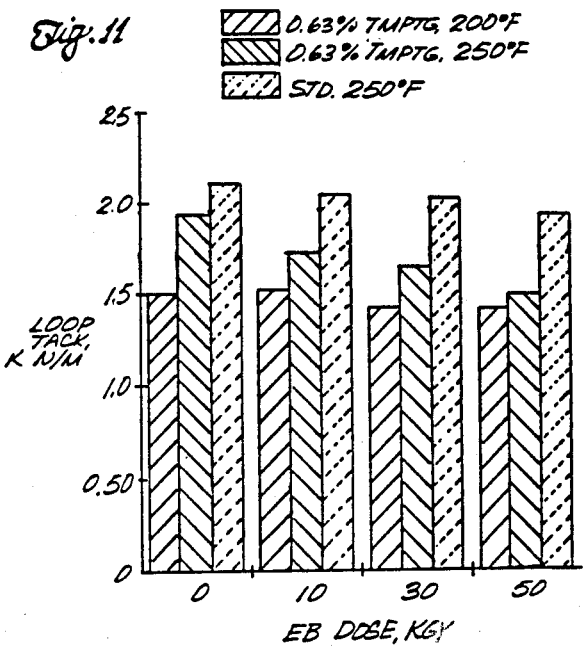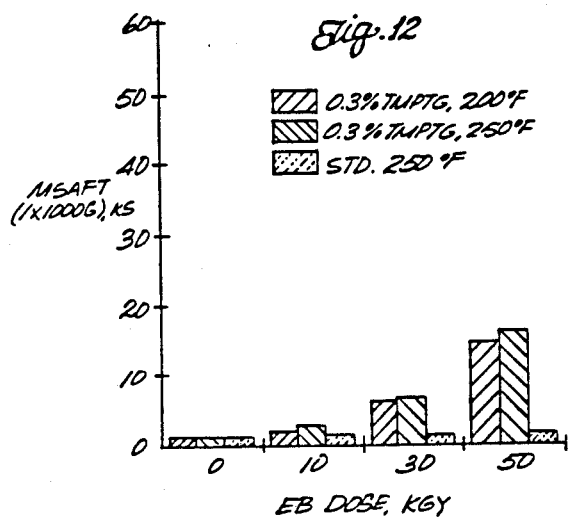

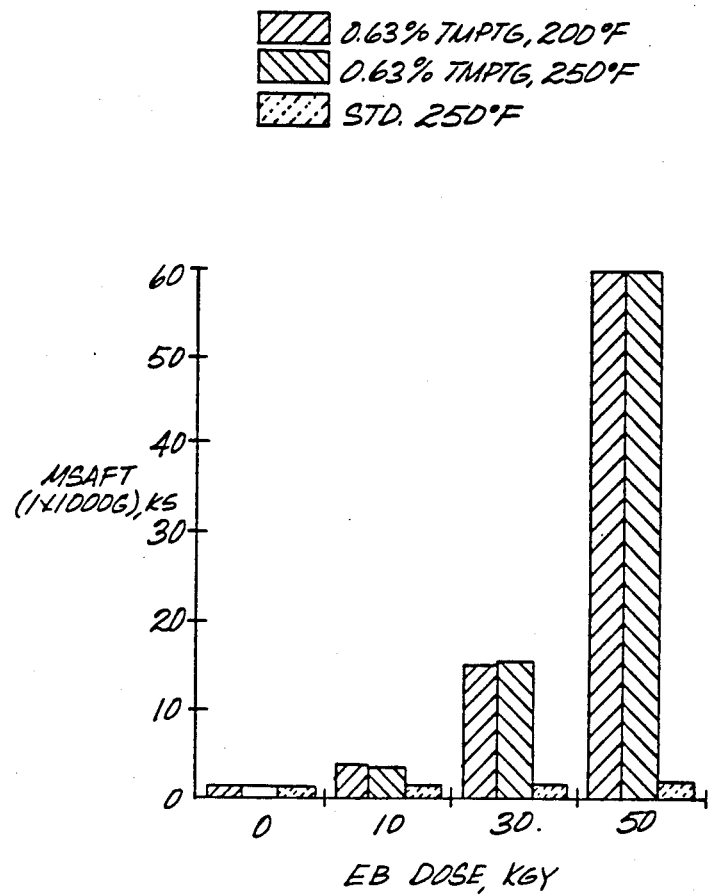

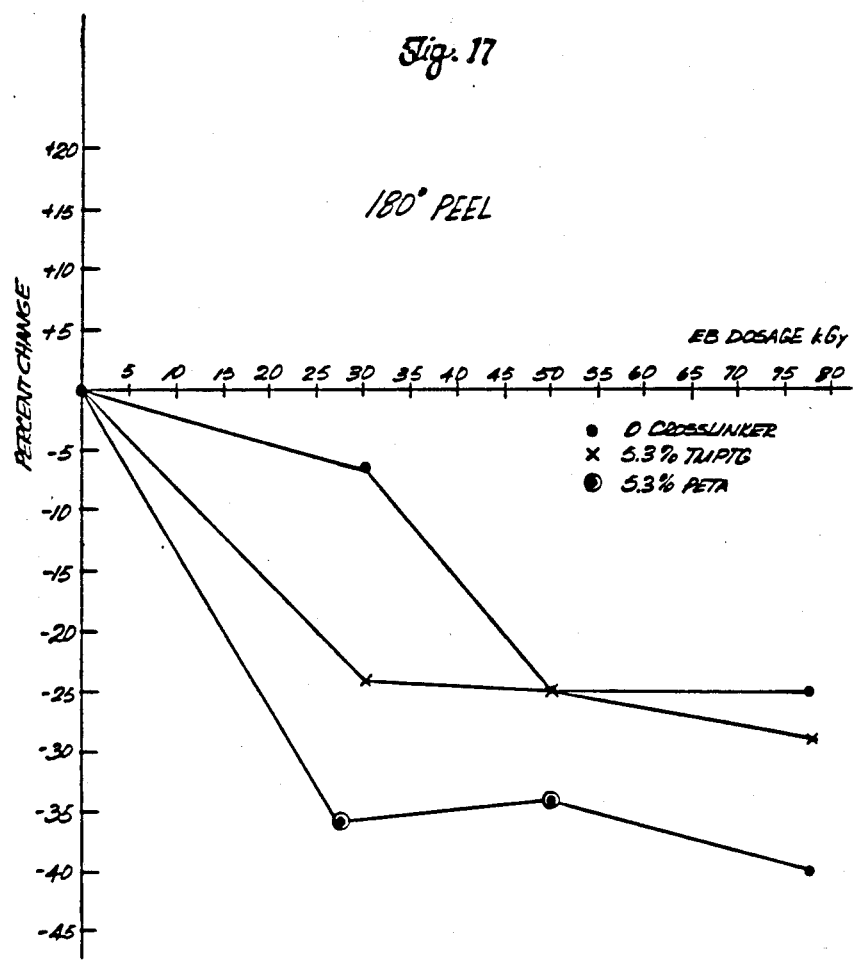

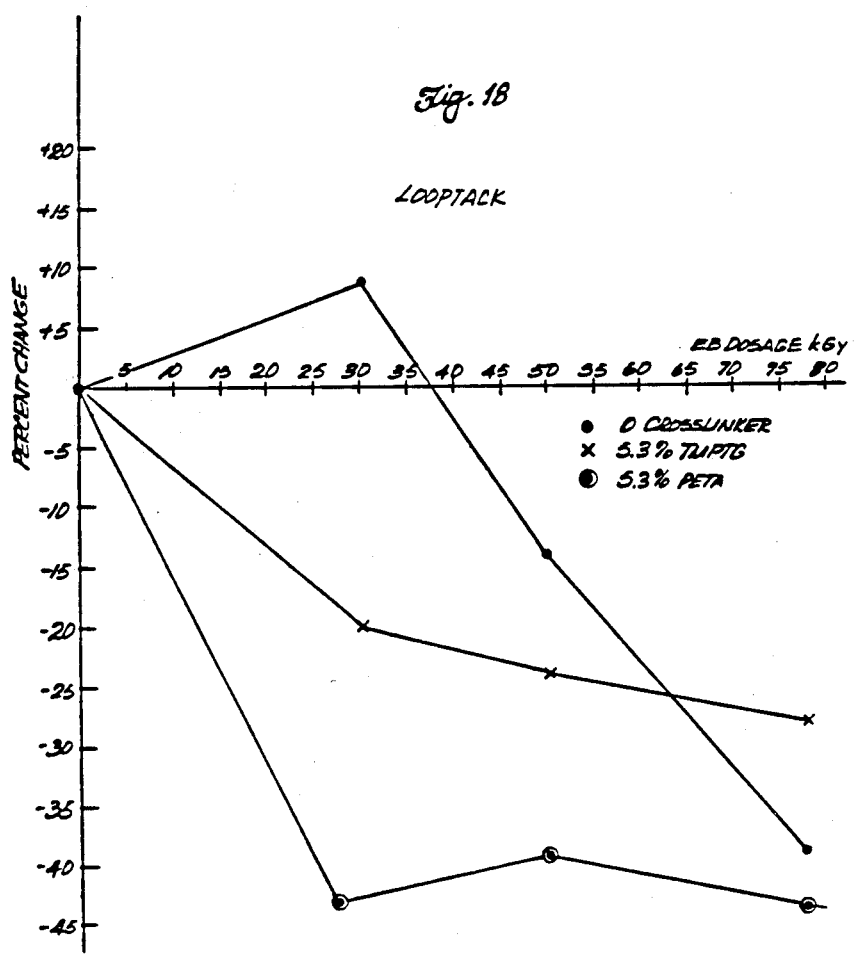

ial that adhesives based on hydrogenated monoalkenylarene-diene block copolymers have relatively low service temperature, poor ultraviolet resistance, poor solvent resistance and high viscosity.

RADIATION-CURED RUBBER-BASED PRESSURE-SENSITIVE ADHESIVE

BACKGROUND OF THE INVENTION

It is stated in U.S. Pat. No. 4,152,231 to St. Claire et al that adhesives based on hydrogenated monoalkenylarene-diene block copolymers have relatively low service temperature, poor ultraviolet resistance, poor solvent resistance and high viscosity.

It was proposed in U.S. Pat. No. 4,152,231 patent that a composition based on 100 parts by weight linear or radially conjugated diene polymers which are homopolymers of C4 to C12 conjugated dienes and copolymers with two or more C4 to C12 conjugated dienes and their halogenated derivatives tackified with from 0 to 254 parts by weight tackifier resin could be enhanced with respect to shear strength, UV resistance and solvent resistance by radiation curing in the presence of 1 to 100 parts by weight di to tetra-functional acrylate or methacrylate selected from acrylic and methacrylic esters of polyols. Conventional plasticizer compounds, oils, liquid resins, fillers and anti-oxidants and the like could be tolerated.

The compositions were disclosed to be curable by exposure to high-energy radiation such as electron-beam (EB) radiation or ultraviolet (UV) radiation. Electron-beam was stated to be preferred since it enabled crosslinking of compositions based on either unhydrogenated or hydrogenated polymers while UV radiation could only initiate crosslinking with unhydrogenated polymers.

A photosensitizer is disclosed as necessary to speed ultraviolet crosslinking reactions.

Polythiols have been proposed for use in the polymerization of and/or crosslinking of polyols. Applications have ranged from the production of printing plates, photoresists, plastic bottle coatings, laquers, cured elastomers and natural rubbers, water-coating and other compositions.

U.S. Pat. No. 3,920,877 to Barber et al discloses that the semi-solid pressure-sensitive polythioether polymer systems may be formed by curring of liquid components using UV or beta radiation. The polymers are normally tacky and when fully cured are useful as pressure-sensitive adhesives. They are characterized as being comprised of liquid polyene compositions containing at least two unsaturated carbon to carbonyl bonds per molecule located terminally or pendant to the main chain backbone and cured to odorless tacky elastomer products with polyols under ambient conditions in the presence of a free-radical generator. The formed adhesives are useful for adhesive tapes, labels, tiles, coverings and the like.

SUMMARY OF THE INVENTION

There is provided in accordance with the invention radiation-curable and cured rubber-based pressure-sensitive adhesives which comprise at least one elastomeric rubber-base pressure-sensitive adhesive and, as a crosslinking agent, at least one polythiol, present in a total amount sufficient to increase upon exposure to electron-beam radiation and/or ultraviolet radiation, the latter with the further presence of a photoinitiator, the elevated temperature shear properties of said rubber-based pressure-sensitive adhesive.

The polythiol is normally present in a concentration of up to about 10% by weight preferably from 0.3 to about 6% by weight more preferably from about 0.3 to about 1% by weight based on a total weight of the pressure-sensitive adhesive rubber and total functional polythiol.

A variety of polythiols can be used, including pentaerythritoltetrathiolglycolate, pentaerythritoltetra(3-mercaptopropionate), trimethylolethanetrimercaptopropionate, trimethylolpropanetrithioglycolate, trimethylolpropanetri(3-mercaptopropionate) and mixtures thereof. The presently preferred rubber-based pressure-sensitive adhesive comprises a tackified mixture of styrene-butadiene-styrene block copolymer and a styrene-butadient block copolymer.

As indicated, cure may be achieved by electron-beam (EB) and/or ultraviolet (UV) radiation. Where electron-beam cure is employed, dosage levels may range from about 10 to about 100 kiloGray (kGy). A photoinitiator is required for UV curing.

As compared to multifunctional acrylates and methacrylates, such polythiol required to achieve the significant increase in high-temperature shear is less and there is a lesser adverse affect on ambient temperature properties such as 180° peel and loop tack.

BRIEF DESCRIPTION OF THE DRAWINGS

The attached figures graphically illustrate the benefit of using the polythiols of the instant invention.

The effect of reducing the level of PETA to 1.25% by weight is depicted in FIG. 4. There occurs less of a loss in ambient temperature properties of 180° peel and loop tack. The dosage requirements are increased substantially to achieve a significant increase in elevated temperature shear.

FIG. 5 shows the ability to reduce TMPTG levels to as low as 0.3% by weight and achieve an excellent improvement in elevated temperature shear with minimal loss of ambient temperature properties.

FIGS. 6–13 graphically illustrate the ability to use TMPTG for solvent-coating operations where the solvent must be evaporated at some elevated temperature. At TMPTG concentrations of 0.3 or 0.63% by weight, elevated temperature properties are improved with minimal change in 180° peel, room temperature shear and loop tack for the more severe SAFT test as described herein.

It will be noted here that the higher concentration of TMPTG had the greatest effect on improving adhesive properties. But still, a major improvement was achieved at least than 1% by weight TMPTG.

Figure 14:
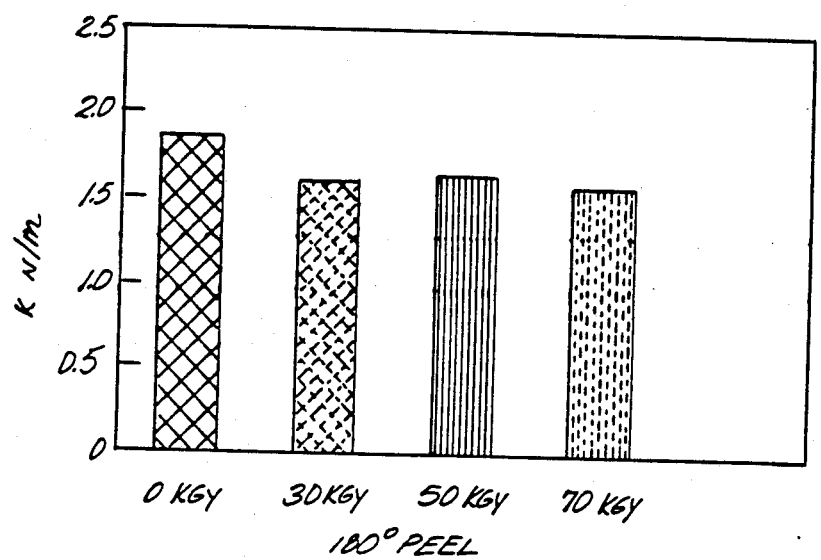
Figure 15:
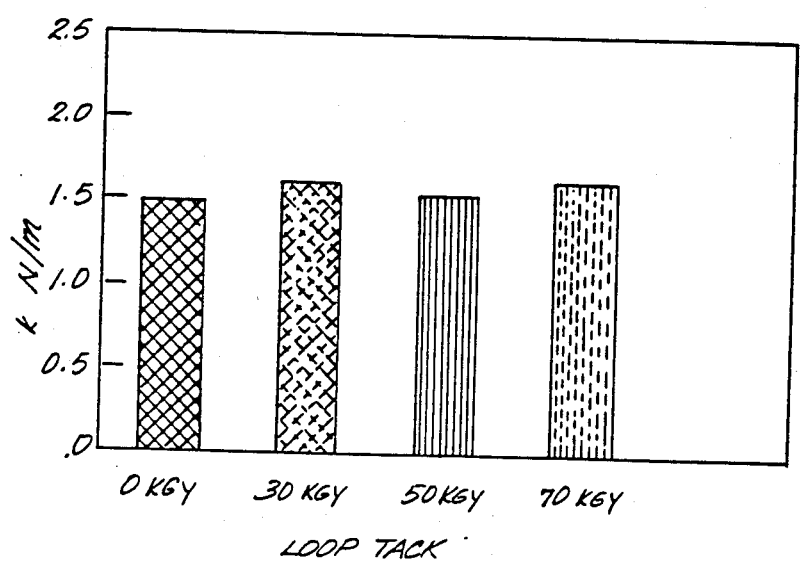
Figure 16:
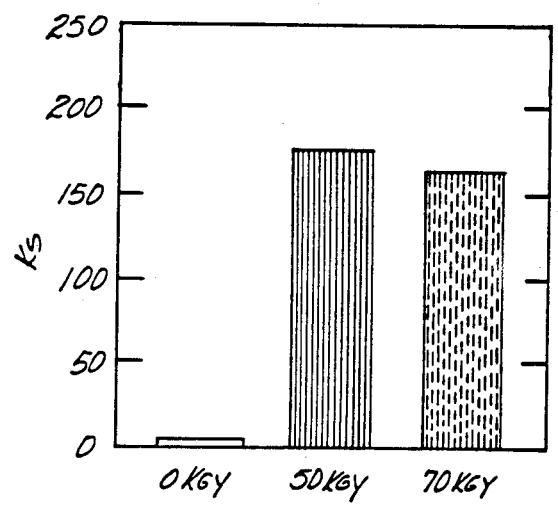

FIGS. 14–16 are for another adhesive system showing the effect of the polythiol on 180° peel, loop tack and 70° C. shear as a function of EB dosage.

FIGS. 17 and 18 plot the percent change in 180° peel and loop tack for 0 crosslinker 5.3% TMPTG and 5.3% PETA to show a much greater loss in these properties with PETA as used when compared to TMPTG. The sources are Tables I, II, and III.

DETAILED DESCRIPTION

According to the present invention, there is provided radiation-cured rubber-based (elastomer) pressure-sensitive adhesives having enhanced elevated temperature properties, in particular elevated temperature shear coupled with excellent adhesion to low and high energy substrates at ambient temperature.

The improvement is realized by irradiating rubber-based pressure-sensitive adhesives, particularly those based on di- and/or tri-block copolymers in which is employed as a crosslinking agent at least one functional polythiol. Improvements in high-temperature shear as compared to other crosslinking materials such as multi-functional acrylates and methacrylates are such that a greater increase in elevated temperature properties can be realized with less crosslinking agents with a lesser reduction in ambient temperature adhesive properties. The utility of products formed in accordance with the invention includes high-temperature duct tapes, transfer tapes, labels and the like.

The pressure-sensitive rubber-based adhesives useful in the practice of the instant invention may be formulated as hot-melt adhesives, solvent adhesives, emulsion adhesives and the like, with hot-melt or solvent-based adhesives presently being preferred.

Pressure-sensitive adhesives employed are normally based on di-block and tri-block copolymers and mixtures thereof. Responsive natural rubbers and non-curing resin modified elastomers may also be used. Suitable rubbers for improvement are described, for instance, in U.S. Pat. Nos. 3,239,478 to Harlan; 4,152,231 to St. Clari et al; 3,676,202 to Korpman; 3,723,170 to Korpman; 3,783,072 to Korpman; 3,932,328 to Korpman; and 4,028,292 to Korpman, each incorporated herein by this reference.

It is presently preferred that the rubber-based pressure-sensitive adhesive compositions enhanced in accordance with the instant invention be styrene-butadiene-styrene, styrene-isoprene-styrene, styrene-butadiene and styrene-isoprene block copolymers, such as the Kraton resins manufactured and sold by Shell Chemical Company.

The polythiols used to enhance the high-temperature properties of the rubber-based pressure-sensitive adhesive may vary widely. We have found that polythiols in which the thiol group is connected to the balance of the polymer chain through an ester linkage are particularly effective.

While no use limiting the functional polythiols which may be used therein mentioned includes pentaerythritoltetrathioglycolate (PETTG), dipentaerythritol-tetra(3-mercaptopropionate), pentaerythritoltetra(3-mercaptopropionate) (PETMP), trimethylolethane-trimercaptopropionate (TMETMP), trimethylol-propanetrithioglycolate (TMPTG), glycoldimercaptoacetate; 2,2,dimercaptodiethylether, polyethyleneglycoldimercaptoacetate, polyethyleneglycol(3-mercaptopropionate, trimethyloltri(3-mercaptopropionate), trimethylolpropanetri(3-mercaptopropionate) (TMFTMP) and the like. Trimethylolpropanetri(3-mercaptopropionate) is presently preferred. Polythiol concentrated can range from up to about 10% by weight of more of the rubber preferrably from about 0.3 to about 0.6% by weight based on the total weight of the rubber and more preferrably from about 0.1 to about 1% by weight. Remarkable results can be obtained in a concentration of less than 1% polythiol.

When electron-beam (EB) is employed as the energy source to increase high-temperature properties, the normal levels may range from about 1 to about 100 kiloGray (kGy) preferably from about 10 to about 50 kGy. An alternative which may be used is ultraviolet radiation. UV irradiation requires the use of a photoinitiator and may be employed in conjunction with EB radiation.

When employing resin modification of a pressure-sensitive adhesive, it is preferred to employ non-curing resins as resins which undergo cure will diminish the improvement in high-temperature properties realized in accordance with the instant invention. In operation, the pressure-sensitive adhesive in normally cast onto a substrate, either face material or release layer, and is subjected to radiation cure (EB, UV or a combination of the two). Cure may be open face, i.e. exposure directly to the surface of the adhesive or through an energy transparent surface such as Mylar. Cure may be of a composite stock, i.e. face material, adhesive and release liner, or in a configuration when after curing, the pressure-sensitive adhesive and face material is wound into a roll or tape.

The particular benefit of using the polythiols of the instant invention is that less agent and energy are used to achieve the same degree of elevated temperature shear properties with minimal reduction in ambient temperature properties as compared with other multi-functional monomers such as multifunctional acrylates and methacrylates.

The following is illustrative of the Examples and Controls provided in accordance with the instant invention.

In the following Examples and Controls, shear was determined by ASTMD-3654-78 and D-1000-60 and PSTC (Pressure-Sensitive Tape Council) Test #7, 6th Ed., Looptack by PSTC Test #7, 6th Ed.

Shear Adhesion Failure Temperature (SAFT) is determined by first heat-bonding aluminum plates overlapped to a bond area of one square inch. The bonded plates are heated to 70° C. and maintained at that temperature for 12 hours. After cooling to ambient temperature, they are placed under a kilogram shear load and temperature raised at the rate of 60° C./hr. The temperature at which bond failure occurs is reported.

For the following Examples and Controls, there were employed as rubber-based pressure-sensitive adhesive:

| % by Wgt. | Component |
|---|---|
| Base Adhesive A | |
| 19.3 | SBS linear copolymer containing about 31% styrene |
| 16.1 | SB copolymer |
| 25.8 | Alpha pinene tackifier |
| 32.3 | Rosin ester tackifier |
| 6.4 | Compatible aromatic liquid resin |
| Base Adhesive B | |
| 38 | SIS radial copolymer |
| 50 | Aliphatic hydrocarbon tackifier |
| 12 | Liquid aliphatic hydrocarbon tackifier |

Note:
Both contained antioxidants.

EXAMPLE 1 AND CONTROLS 1 TO 3

The Base Adhesive A of Table I was mixed with 5.3% by weight trimethylolpropane trithioglycolate (TMPTG) and coated to a level of about 50± grams meter squared onto a substrate and dried at 70° C. for 15 minutes. The coating samples were laminatined to Mylar and ED radiated tnrough Mylar at the dosage levels shown in Tables I to IV.

Figure 1:
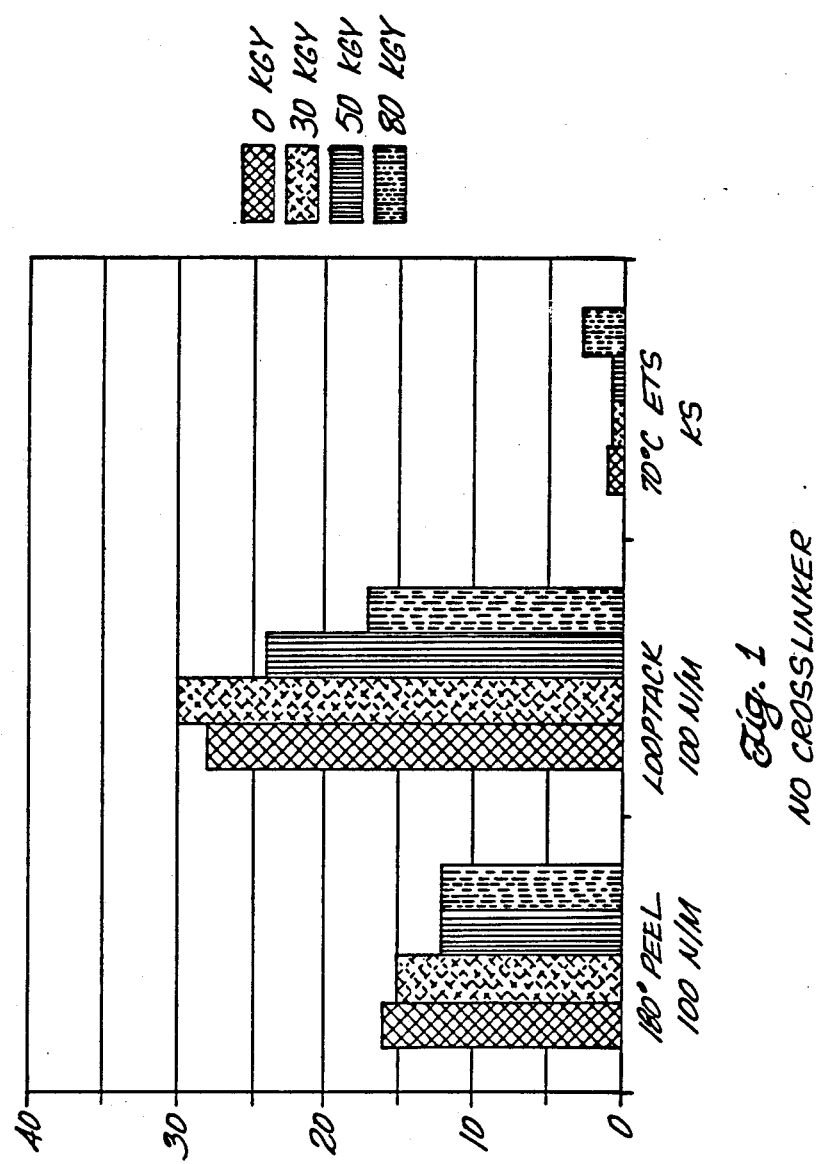
FIG. 1 graphically shows the effect of using various dosages of electron-beam radiation in the absence of a polythiol or multifunctional acrylate.
Figure 2:
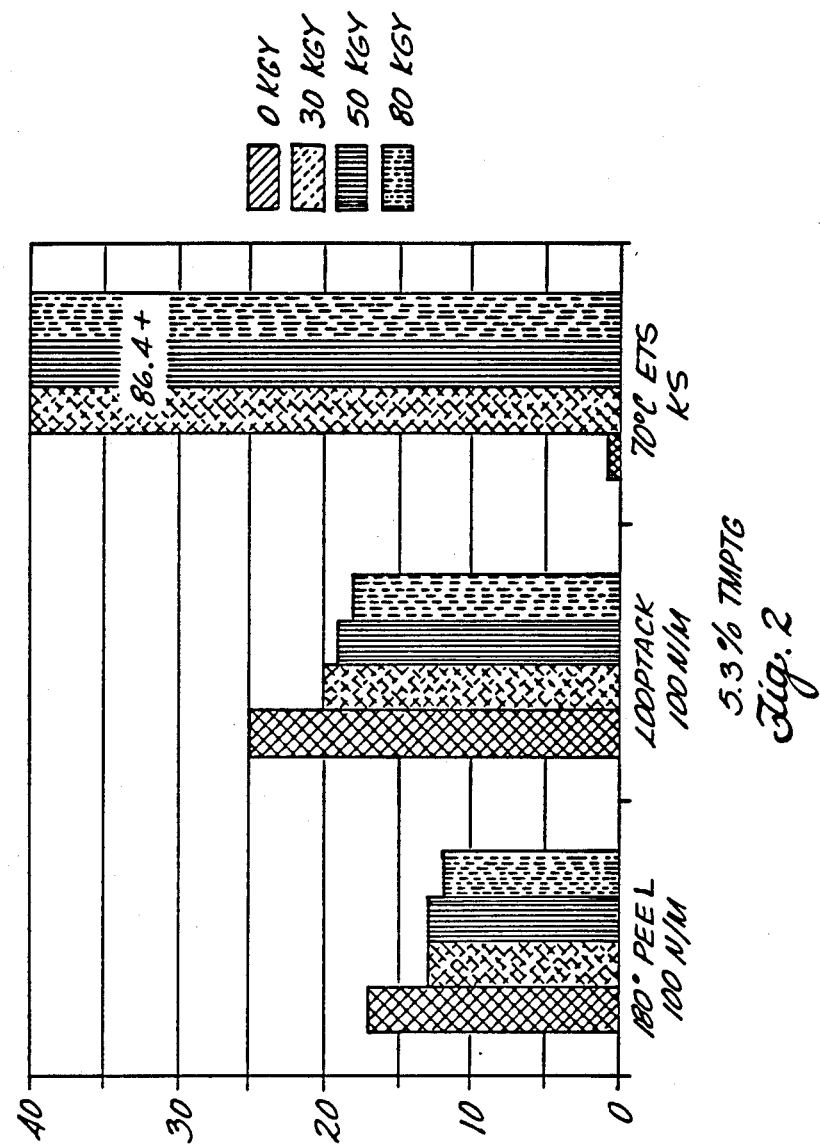
FIG. 2 shows the effect of using 5.3% of TMPTG, a multifunctional polythiol. While elevated temperature shear is significantly increased, there is a relatively minimal loss in 180° peel and loop tack at ambient temperature.
Figure 3:
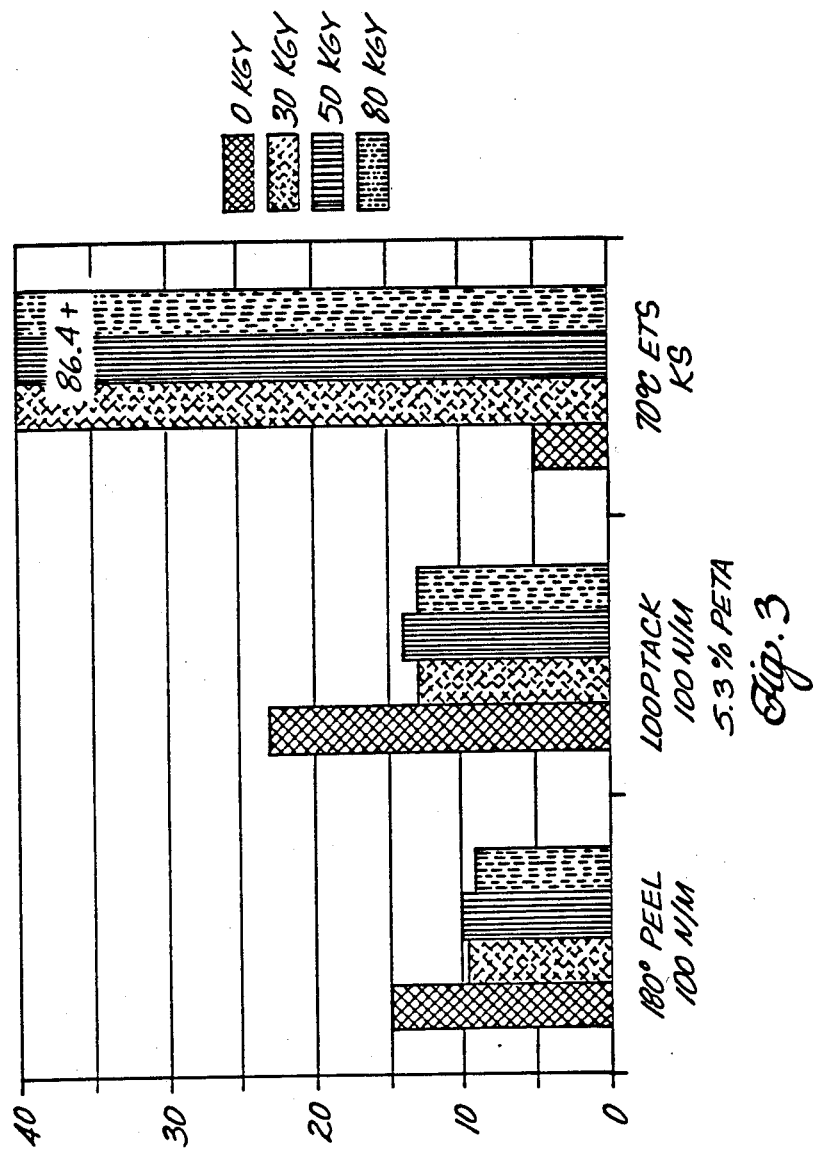
FIG. 3 shows, by contrast, the use of 5.3% PETA (pentaerythritoltriacrylate) which results in a substantially greater loss in 180° peel and loop tack. The percentages of losses or gains of FIGS. 1, 2 and 3 are shown in FIGS. 17 and 18.

Tables I and II show the relative performance of the composition with and without addition of TMPTG. Table III, serving as a control, illustrates that while pentaerythritoltriacrylate (PETA) can also improve elevated temperature performance, there is a material sacrifice of ambient temperature properties particularly loop tack. FIGS. 1, 2 and 3 graphically display the differences.

When the concentration of PETA was reduced by 1.25% by weight, where there was a significant loss in peel and loop tack with the most significant loss in loop tack, there was a lesser improvement in elevated temperature shear establishing that the effectiveness of PETA was dropping off. This is shown in Table III and graphically depicted in FIG. 4.

By contrast, in utilizing 1.25% TMPTG, and as shown in Table IV, elevated temperature shear was still in excess of 86.4 kiloseconds and the level of elevated temperature shear was significantly unchanged when maintained at 70° C. over a period of 8 weeks. It was evident that TMPTG was dramatically and unexpectedly superior to PETA in the ability to achieve improved elevated temperature properties at minimal concentration with minimal adverse affect on ambient temperature properties of 180° peel and loop track at ambient temperature.

TABLE I

| | (Control 1) No Crosslinking Additive | | | |
| --- | --- | --- | --- | --- |
| EB Dosage, kGy | 0 | 30 | 50 | 80 |
| 180° Peel, kN/m | 1.6(p) | 1.5(p) | 1.2(p) | 1.2(p) |
| Looptack, kN/m | 2.8(p) | 3.0(p) | 2.4(p) | 1.7(p) |
| Shear at 70° C.*, ks | 1.02(c) | 0.86(c) | 0.63(c) | 2.8(c) |

TABLE II

| | (Example 1) Crosslinking Additive - 5.3% by wgt TMPTG | | | |
| --- | --- | --- | --- | --- |
| EB Dosage, kGy | 0 | 30 | 50 | 80 |
| 180° Peel, kN/m | 1.7(ps) | 1.3(ps) | 1.3(ps) | 1.2(ps) |
| Looptack, kN/m | 2.5(p) | 2.0(p) | 1.9(p) | 1.8(p) |
| 70° C. ETS, ks | 0.8(c) | 86.4 + (nc) | 86.4 + (nc) | 86.4 + (nc) |

TABLE III

| | (Control 2) Crosslinking Additive - 5.3% by wgt PETA | | | |
| --- | --- | --- | --- | --- |
| EB Dosage, kGy | 0 | 30 | 50 | 80 |
| 180° Peel, kN/m | 1.5(ps) | 0.95(ps) | 0.99(ps) | 0.90(ps) |
| Looptack, kN/m | 2.3(p) | 1.3(p) | 1.4(p) | 1.3(p) |
| 70° C. ETS, ks | 4.7(c) | 86.4 + (nc) | 86.4 + (nc) | 86.4 + (nc) |

TABLE IV

| | (Control 3) Crosslinking Additive - 1.25% by wgt PETA | | | |
| --- | --- | --- | --- | --- |
| EB Dosage, kGy | 0 | 30 | 50 | 80 |
| 180° Peel, kN/m | 1.2(ps) | 1.3(ps) | 1.2(ps) | 1.1(ps) |
| Looptack, kN/m | 1.7(p) | 1.8(p) | 1.7(p) | 1.7(p) |
| 70° C. ETS, ks | 4.7 | 6.8(p) | 24.7(p) | 63. (p) | ks = kiloseconds
ETS = Elevated Temperature Shear
p = panel failure
c = cohesive failure
ps = panel stain
nc = no creep
+ = greater than
kn/m = kilo newtons/meter
*70° C. ETS

EXAMPLE 2

The data is shown in Table V and graphically illustrated in FIG. 5 establishing that using the Base Adhesive A elevated temperature shear at 50 kGy was quite high for a TMPTG concentration of only 0.3% by weight of the composition. The dramatic improvement in elevated temperature shear was realized with even less affect on room temperature properties, particularly loop tack.

TABLE V

| Dosage kGy | TMPTG Con. Wgt % | 180° Peel RT, kN/m | Loop Tack, kN/m | 70° C. ETS. ks, 500 g |
| --- | --- | --- | --- | --- |
| 0 | 0 | 1.6(p) | 2.3(p) | 0.77(c) |
| 50 | 0.3 | 1.3(ps) | 2.2(p) | 86.4 + (nc) |

EXAMPLE 3

The following study, graphically illustrated in FIGS. 6 to 13, was to establish that the use of TMPTG to enhance properties is unaffected by solvent coating of the base adhesive. In each, there is shown the TMPTG concentration and whether the cast adhesive had been heated to 20° or to 250° during the solvent removal process at the TMPTG levels shown.

With respect to FIGS. 6 and 7, concerning the property of 180° peel adhesion, the lesser amount of TMPTG caused the least reduction in 180° peel adhesion and even matched low-temperature adhesion at a dosage of 10 kGy.

With respect to FIG. 7; increasing TMPTG concentration to 0.63% by weight TMPTG with all other factors being the same resulted in some loss in 180° peel adhesion, but again the amount was negligible.

Figure 9:
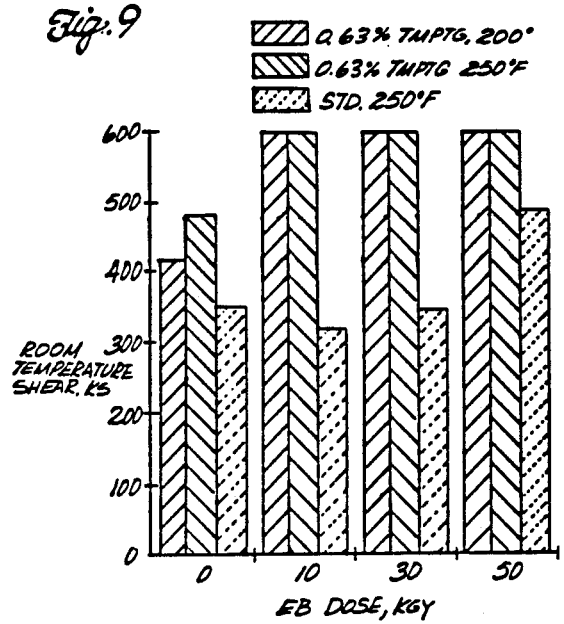
Figure 10:
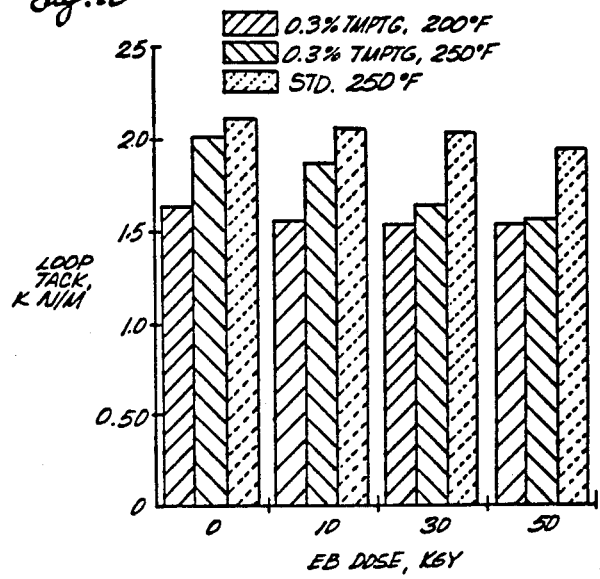

As shown in FIGS. 8 and 9, there was a marked improvement in room temperature shear dosages from 10 to 50 kGy as compared to compositions to which no TMPTG had been added FIGS. 10 and 11 establish loop tack and gave comparable results were both 0.3% TMPTG and 0.63% TMPTG.

As shown in FIGS. 12 and 13, for the more strenuous SAFT tests the higher concentration of TMPTG, mainly 0.63% by weight, appeared to have a pronounced improvement in time resistance to failure as compared to the lower level of 0.3% by weight TMPTG. It should be noted, however, that PETA at the levels employed would not provide any significant improvement.

EXAMPLES 4 TO 15 AND CONTROL 4

The following Examples illustrate the affect of other polythiols on Shear Adhesion Failure Temperature (SAFT) and 70° C. and room and elevated temperature shear.

| Example/Control | Polythiol | EB Dosage | SAFT 1 kg/n² @ 1° C./min. | 70° C. Shear ks | RT Shear ks |
|---|---|---|---|---|---|
| Cont. 4 | 0 | — | 82.2° C. | 2.6(c) | 216+ |
| Ex. 4 | 0.3 TMPTG | 25 | 87 | | |
| Ex. 5 | 0.3 TMPTG | 50 | 85 | | |
| Ex. 6 | 0.5 TMPTG | 25 | 125 | | |
| Ex. 7 | 0.5 TMPTG | 50 | 135 | | |
| Ex. 8 | 0.8 TMPTG | 25 | 131 | 216+ | 684+ |
| Ex. 9 | 0.8 TMPTG | 50 | 140 | 216+ | 684+ |
| Ex. 10 | 0.8 PETTG | 25 | 131 | 216+ | 684+ |
| Ex. 11 | 0.8 PETTG | 50 | 160 | 216+ | 684+ |
| Ex. 12 | 0.8 PETMP | 25 | 126 | 216+ | 684+ |
| Ex. 13 | 0.8 PETMP | 50 | 160 | 216+ | 684+ |
| Ex. 14 | 0.8 TMETMP | 25 | 125 | 216+ | 684+ |
| Ex. 15 | 0.8 TMETMP | 50 | 159 | 216+ | 684+ |

RT = room temperature

EXAMPLES 16 AND 7 AND CONTROLS 5 AND 6

Base Adhesive B was used for Examples 6 and 7 there was added 1% by weight TMPTG. For instance, the adhesive was hot-melt coated onto a substrate (Mylar for Example 6 and Control 4 and aluminum for Example 17 and Control 6) to a coating level of 50 grams per sq. m. Controls 5 and 6 show adhesive performance at 0 kGy while Examples 16 and 17 show adhesive performance after dosage to levels of 30, 50 and 70 kGy. The results are tabulated in Tables VI and VII, and for Table VI depicted in FIGS. 14, 15 and 16.

TABLE VI

| EB Dosage, kGy | 0 | 30 | 50 | 70 |
|---|---|---|---|---|
| 180° Peel, kN/m | 1.0 | 1.14 | 1.16 | 1.06 |
| Looptack, kN/m | 1.50(p) | 1.42(p) | 1.50(p) | 1.46(p) |
| RTS(a), ks | 171.7 | 171.7 | 171.7 | 9(p) |
| 70° C. ETS, ks | 0.4(c) | 2.6(p/c) | 27.5(p/c) | 33(p/c) |

TABLE VII

| EB Dosage, kGy | 0 | 30 | 50 | 80 |
|---|---|---|---|---|
| 180° Peel, kN/m | 1.36 | 1.48 | 1.39 | 1.35 |
| 70° C. ETS(a), ks | 0.98 | 38.3(c) | 177(f/c) | 163(f/p) | a = 1 kg load
f = face stock failure

EXAMPLE 18

Using Base Adhesive A, TMPTG was compared to TMPTMP as a polythiol crosslinker at concentrations of up to 1% by weight. Table VIII shows the initial performance of the EB-cured composition, while Table IX shows the change for the composition cured at a dosage of 50 kGy for the time and temperature shown.

TABLE VIII

| CROSSLINKER: | TMPTG | TMPTMP | TMPTMP | TMPTMP | TMPTMP |
|---|---|---|---|---|---|
| LEVEL: | 0.3% | 0.4% | 0.6% | 0.8% | 1.0% |
| S.A.F.T. (°C.) | | | | | |
| 30 kGy | 101 | 87 | 84 | 86 | 93 |
| 40 kGy | 122 | 100 | 94 | 101 | 93 |
| 50 kGy | 141 | 106 | 108 | 111 | 128 |
| 180° SS Peel (kN/m) | | | | | |
| 30 kGy | 2.03 | 2.22 | 2.33 | 2.19 | 2.05 |
| 40 kGy | 1.92 | 2.19 | 2.22 | 2.08 | 2.05 |
| 50 kGy | 1.94 | 2.19 | 2.10 | 2.08 | 2.05 |
| 180° PP Peel (kN/m) | | | | | |
| 30 kGy | 1.40 | 1.59 | 1.65 | 1.35 | 1.44 |
| 40 kGy | 1.14 | 1.68 | 1.58 | 1.40 | 1.21 |
| 50 kGy | 1.26 | 1.66 | 1.44 | 1.28 | 1.12 |

SS = stainless steel
PP = polypropylene

TABLE IX

| CROSSLINKER: | TMPTG | TMPTMP | TMPTMP | TMPTMP | TMPTMP |
|---|---|---|---|---|---|
| LEVEL: | 0.3% | 0.4% | 0.6% | 0.8% | 1.0% |
| S.A.F.T. (°C.) | | | | | |
| Initial | 141 | 106 | 108 | 111 | 128 |
| 2 Wk. @ 50° C. | 127 | 118 | 124 | 118 | 115 |
| 4 Wk. @ 50° C. | 144 | 125 | 113 | 127 | 139 |
| 180° SS Peel (kN/m) | | | | | |
| Initial | 1.94 | 2.19 | 2.10 | 2.08 | 2.00 |
| 2 Wk. @ RT | 1.65 | 1.79 | 1.75 | 1.68 | 1.70 |
| 2 Wk. @ 50° C. | 1.79 | 1.86 | 1.87 | 1.84 | 1.75 |
| 4 Wk. @ RT | 1.94 | 2.05 | 2.01 | 2.05 | 1.98 |
| 4 Wk. @ 50° C. | 2.08 | 2.19 | 2.26 | 2.05 | 2.03 |

EXAMPLES 19 TO 26 AND CONTROL 8

To 100 parts by weight of Base Adhesive A there was added 1 part by weight photoinitiator Irgacure 651, manufactured and sold by Ciba-Geigy Co., and 0.6 parts by weight TMPTG. The mix was knife-coated onto a release surface and dried at 70° C. for 20 minutes to the coating weight shown in Table X. The ultraviolet lamps used were 80 watts/cm with surface exposure being dependant on web speed.

TABLE X

| Example/Control | Ct. Wt. (g/m²) | Web Speed (ft/min. lamp) | U.V. Dose kj/m² | EB dosage (kGy) | Face Exposure | 180° Peel (KN/m) | Loop Tack (KN/m) | E.T. Shear (70° C.) ks |
|---|---|---|---|---|---|---|---|---|
| Cont. 8 | 60 | Infinity | 0 | — | Open Face | 2.32(p) | — | 2.68(c) |
| Ex. 19 | 60 | 20 | 5.8 | — | | 1.72(p) | 1.74(ss) | 592 + (nc) |
| Ex. 20 | 60 | 40 | 2.4 | — | | 1.76(p) | 1.74(ss) | 276 + (nc) |
| Ex. 21 | 60 | 60 | 1.6 | — | | 2.02(p) | 2.57(ss) | 1.4(f) |
| Ex. 22 | 60 | 75 | 1.4 | — | | 1.74(p) | 1.47 | 4.16(b) |
| Ex. 23 | 60 | 100 | 1.0 | — | | 1.77 | 2.02(ss) | 276 + (nc) |
| Ex. 24 | 44 | 20 | 5.8 | — | Thru Mylar | 1.05(p) | 0.824(ss) | 1.4(f) |
| Ex. 25 | 44 | 60 | 1.6 | — | | 1.42(p) | 2.37(p) | 1.4(f) |
| Ex. 26 | 44 | 75 | 1.4 | 50 | | 1.31(p) | 1.38(ss) | 2.8(f/p) | c = cohesive failure
b = 1 kg load
ss = slipstick
kj/m² = kilojoules/m²

What is claimed is:

1. A radiation-curable rubber-based pressure-sensitive adhesive which comprises at least one elastomeric rubber-baseed pressure-sensitive adhesive comprising a block copolymer selected from the group consisting of styrene-butadiene-styrene, styrene-butadiene, styrene-isoprene-styrene, styrene-isoprene and mixtures thereof and, as a crosslinking agent, a polythiol present in an amount sufficient to increase upon exposure to electron-beam radiation or ultraviolet radiation in the further presence of a photoinitiator, the elevated temperature shear properties of said rubber-based prressure-sensitive adhesive, with a minimum change in ambient temperature properties of 180° peel and loop tack of said rubber-based pressure-sensitive adhesive relative to such properties of the same rubber-based pressure-sensitive adhesive cured in the absence of said polythiol.

2. A radiation-curable rubber-based pressure-sensitive adhesive which comprises at least one elastomeric rubber-based pressure-sensitive adhesive comprising a block copolymer selected from the group consisting of styrene-butadiene-styrene, styrene-isoprene-styrene, styrene-butadiene and styrene-isoprene block copolymers and mixtures thereof and a polythiol crosslinking agent present in a positive amount up to about 10% by weight based on the weight of the rubber-based pressure-sensitive adhesive and polythiol.

3. A rubber-based pressure-sensitive adhesive as claimed in claim 2 in which the polythiol crosslinking agent is selected from the group consisting of pentaerythritoltetrathiolglycolate, pentaerythritoltetra(3-mercaptopropionate), trimethylolethanetrimercaptopropionate, trimethylolpropanetrithioglycolate, trimethylolpropanetri(3-mercaptopropionate), and mixtures thereof.

4. A rubber-based pressure sensitive adhesive as claimed in claim 2 in which the polythiol is present in a concentration of from 0.3 to about 6% by weight based on a total weight of the rubber-based pressure-sensitive adhesive rubber and the polythiol.

5. A rubber-based pressure-sensitive adhesive as claimed in claim 2 in which the polythiol is present in a concentration of from about 0.3 to about 1% by weight based on a total weight of the rubber-based pressure-sensitive adhesive and the polythiol.

6. A rubber-based pressure-sensitive adhesive as claimed in claim 3 in which the polythiol is present in a concentration of from about 0.3 to about 1% by weight based on a total weight of the rubber-based pressure-sensitive adhesive and the polythiol.

7. A rubber-based pressure-sensitive adhesive as claimed in claim 1 in which the rubber-based pressure-sensitive adhesive comprises a styrene-butadiene-styrene block copolymer.

8. A rubber-based pressure-sensitive adhesive as claimed in claim 2 in which the rubber-based pressure-sensitive adhesive comprises a styrene-butadiene-styrene block copolymer.

9. A radiation-cured rubber-based pressure-sensitive adhesive which comprises at least one elastomeric rubber-based pressure-sensitive adhesive formed of a tackified elastomer comprising a block copolymer selected from the group consisting of styrene-butadiene-styrene, styrene-isoprene-styrene, styrene-butadiene and styrene-isoprene block copolymers and mixtures thereof which is cured by electron-beam radiation at a level up to about 100 kGy in the presence of a functional polythiol crosslinking agent present in an amount up to about 10% by weight based on the weight of the pressure-sensitive adhesive and the polythiol, said electromeric rubber-based pressure-sensitive adhesive exhibiting following cure a 70° C. shear greater than 86.4 kiloseconds with minimal change in the ambient temperature properties of 180° peel and loop tack of said rubber-based pressure-sensitive adhesive relative to the properties of the same rubber-based pressure-sensitive adhesive cured in the absence of said polythiol.

10. A radiation-cured pressure-sensitive adhesive as claimed in claim 9 in which the functional polythiol is selected from the group consisting of pentaerythritoltetrathiolgylycolate, pentaerythritoltetra(3-mercaptopropionate), trimethylolethanetrimercaptopropionate, trimethylolpropanetrithioglycolate, trimethylolpropanetris(3-mercaptopropionate), and mixtures thereof.

11. A radiation-cured rubber-based pressure-sensitive adhesive as claimed in claim 9 in which the rubber-based pressure-sensitive adhesive comprises a styrene-butadiene-styrene block copolymer.

12. A radiation-cured pressure-sensitive achieve as claimed in claim 11 in which the functional polythiol is selected from the group consisting of pentaerythritoltetrathiolglycolate, pentaerythritoltetra(3-mercaptopropionate), trimethylolethanetrimercaptopropionate, trimethylolpropanetrithioglycolate, trimethylolpropanetri(3-mercaptopropionate), and mixtures thereof.

13. a radiation-cured rubber-based pressure-sensitive adhesive as claimed in claim 9 in which the polythiol is present in a concentration of from 0.3 to about 6% by weight based on a total weight of the pressure-sensitive adhesive rubber and polythiol.

14. A radiation-cured rubber-based pressure-sensitive adhesive as claimed in claim 9 in which the polythiol is present in a concentration of from about 0.3 to about 1% by weight based on a total weight of the pressure-sensitive adhesive and the polythiol.

15. A radiation-cured rubber-based pressure-sensitive adhesive as claimed in claim 10 in which the rubber-based pressure-sensitive adhesive comprises a styrene-butadiene-styrene block copolymer.

16. A radiation-cured rubber-based pressure-sensitive adhesive which comprises at least one elastomeric rubber-based pressure-sensitive adhesive comprising a block copolymer selected from the group consisting of styrene-butadiene-styrene, styrene-butadiene, styrene-isoprene-styrene, styrene-isoprene and mixtures thereof and cured by ultraviolet radiation in the presence of a photoinitiator and a functional polythiol crosslinking agent present in an amount up to about 10% by weight based on the weight of the rubber-based pressure-sensitive adhesive and polythiol.

17. A radiation-cured pressure-sensitive adhesive as claimed in claim 16 in which the functional polythiol crosslinking agent is selected from the group consisting of pentaerythritoltetrathiolglycolate, pentaerythritoltetra(3-mercaptopropionate), trimethylolethanetrimercaptopropionate, trimethylolpropanetrithioglycolate, trimethylolpropanetri(3-mercaptopropionate), and mixtures thereof.

18. A radiation-cured rubber-based pressure-sensitive adhesive as claimed in claim 16 in which the rubber-based pressure-sensitive adhesive comprises a styrene-butadiene-styrene block copolymer.

19. A radiation-cured rubber-based pressure-sensitive adhesive as claimed in claim 17 in which the rubber-based pressure-sensitive adhesive comprises a styrene-butadiene-styrene block copolymer.

20. A radiation-cured rubber-based pressure-sensitive adhesive as claimed in claim 16 in which the polythiol is present in a concentration of from 0.3 to about 6% by weight based on a total weight of the pressure-sensitive adhesive rubber and the polythiol.

21. A radiation-cured rubber-based pressure-sensitive adhesive as claimed in claim 16 in which the polythiol is present in a concentration of from about 0.3 to about 1% by weight based on a total weight of the pressure-sensitive adhesive and the polythiol.

22. A process for improving the high-temperature properties of rubber-based pressure-sensitive adhesives which comprising subjecting a rubber-based pressure sensitive adhesive comprising a block copolymer selected from the group consisting of styrene-butadiene-styrene, styrene-isoprene-styrene, styrene-butadiene and styrene-isoprene block copolymers and mixtures thereof which is the action of electron-beam radiation, in the presence of a polythiol crosslinking agent, said polythiol being present in an amount up to about 10% by weight based on the weight of the pressure-sensitive adhesive, at a dosage level sufficient to increase 70% shear of the pressure-sensitive adhesive with minimal change in ambient temperature properties of 180° peel and loop tack relative to such properties of said pressure-sensitive adhesive cured in the absence of said polythiol.

23. A process as claimed in claim 22 in which the electron-beam radiation dosage level is from about 10 to 100 kiloGray.

24. A process as claimed in claim 22 in which the level of exposure is from about 10 to about 50 kiloGray.

25. A process as claimed in claim 22 in which the pressure-sensitive adhesive comprises a styrene-butadiene-styrene block copolymer.

26. A process as claimed in claim 22 in which the functional polythiol crosslinking agent is selected from the group consisting of pentaerythritoltetrathiolglycolate, pentaerythritoltetra(3-mercaptopropionate), trimethylolethanetrimercaptopropionate, trimethylolpropanetrithiolglycolate, trimethylolpropanetri(3-mercaptopropionate), and mixtures thereof.

27. A process as claimed in claim 23 in which the functional polythiol crosslinking agent is selected from the group consisting of pentaerythritoltetrathiolglycolate, pentaerythritoltetra(3-mercaptopropionate), trimethylolethanetrimercaptopropionate, trimethylolpropanetrithioglycolate, trimethylolpropanetri(3-mercaptopropionate), and mixtures thereof.

28. A process as claimed in claim 24 in which the functional polythiol crosslinking agent is selected from the group consisting of pentaerythritoltetrathiolglycolate, pentaerythritoltetra(3-mercaptopropionate), trimethylolethanetrimercaptopropionate, trimethylolpropanetrithioglycolate, trimethylolpropanetri(3-mercaptoprorionate), and mixtures thereof.

29. A process as claimed in claim 25 in which the functional polythiol crosslinking agent is selected from the group consisting of pentaerythritoltetrathiolglycolate, pentaerythritoltetra(3-mercaptopropionate), trimethylolethanetrimercaptopropionate, trimethylolpropanetrithiolglycolate, trimethylolpropanetri(3-mercaptopropionate), and mixtures thereof.

30. A process as claimed in claim 22 in which the polythiol is present in a concentration of from about 0.3 to about 6% by weight based on a total weight of the pressure-sensitive adhesive rubber and the polythiol.

31. A process as claimed in claim 25 in which the polythiol is present in a concentration of from about 0.3 to about 6% by weight based on a total weight of the pressure-sensitive adhesive rubber and the polythiol.

32. A process as claimed in claim 26 in which the polythiol is present in a concentration of from about 0.3 to about 6% by weight based on a total weight of the pressure-sensitive adhesive rubber and the polythiol.

33. A process as claimed in claim 22 in which the polythiol is present in a concentration of from about 0.3 to about 1% by weight based on a total weight of the pressure-sensitive adhesive and the polythiol.

34. A process as claimed in claim 23 in which the polythiol is present in a concentration of from about 0.3 to about 1% by weight based on a total weight of the pressure-sensitive adhesive and the polythiol.

35. A process as claimed in claim 28 in which the polythiol is present in a concentration of from about 0.3 to about 1% by weight based on a total weight of the pressure-sensitive adhesive and the polythiol.

36. A process as claimed in claim 29 in which the polythiol is present in a concentration of from about 0.3 to about 1% by weight based on a total weight of the pressure-sensitive adhesive and the polythiol.

37. A process for improving the high-temperature properties of rubber-based pressure-sensitive adhesives comprising a block copolymer selected from the group consisting of styrene-butadiene-styrene, styrene-isoprene-styrene, styrene-butadiene and styrene-isoprene block copolymers and mixtures thereof, which comprises subjecting a rubber-based pressure-sensitive adhesive, comprising at least one rubber-based pressure-sensitive adhesive formed of a tackified elastomer which is responsive to the action of ultraviolet radiation, in the presence of a photoiniator and polythiol crosslinking agent, present in an amount up to about 10% by weight based on the weight of the pressure-sensitive adhesive, at a dosage level sufficient to increase the 70° C. shear of the pressure-sensitive adhesive with minimal change in the ambient temperature properties of 180° shear and loop tack of said rubber-based pressure-sensitive adhesive cured in the absence of said polythiol.

38. A process as claimed in claim 37 in which the pressure-sensitive adhesive comprises a styrene-butadiene-styrene block copolymer.

39. A process as claimed in claim 37 in which the polyfunctional thiol is selected from the group consisting of pentaerythritoltetrathiolglycolate, pentaerythritoltetra(3-mercaptopropionate), trimethylolethanetrimercaptopropionate, trimethylolpropanetrithioglycolate, trimethylolpropanetri(3-mercaptopropionate), and mixtures thereof.

40. A process as claimed in claim 38 in which the polyfunctional thiol is selected from the group consisting of pentaerythritoltetrathiolglycolate, pentaerythritoltetra(3-mercaptopropionate), trimethylolethanetrimercaptopropionate, trimethylolpropanetrithioglycolate, trimethylolpropanetri(3-mercaptopropionate), and mixtures thereof.

41. A process as claimed in claim 37 in which the polythiol is present in a concentration of from about 0.3 to about 6% by weight based on a total weight of the pressure-sensitive adhesive and the polythiol.

42. A process as claimed in claim 38 in which the polythiol is present in a concentration of from about 0.3 to about 6% by weight based on a total weight of the pressure-sensitive adhesive and the polythiol.

43. A process as claimed in claim 39 in which the polythiol is present in a concentration of from about 0.3 to about 6% by weight based on a total weight of the pressure-sensitive adhesive and the polythiol.

44. A process as claimed in claim 37 in which the polythiol is present in a concentration of from about 0.3 to about 1% by weight based on a total weight of the pressure-sensitive adhesive and the polythiol.

45. A process as claimed in claim 38 in which the polythiol is present in a concentration of from about 0.3 to about 1% by weight based on a total weight of the pressure-sensitive adhesive and the polythiol.

46. A process as claimed in claim 39 in which the polythiol is present in a concentration of from about 0.3 to about 1% by weight based on a total weight of the pressure-sensitive adhesive and the polythiol.

* * * * *

UNITED STATES PATENT AND TRADEMARK OFFICE
CERTIFICATE OF CORRECTION

PATENT NO. : 4,820,746
DATED : April 11, 1989
INVENTOR(S) : C.S. Rice; Y. Sasaki; S.S. Plamthottam Page 1 of 2

It is certified that error appears in the above-identified patent and that said Letters Patent is hereby corrected as shown below:

In the Specification:

Column 1, line 38, change "laquers" to -- lacquers --.
Column 1, line 43, change "curring" to -- curing --.

Column 2, line 13, change "butadient" to -- butadiene --.
Column 2, line 62, change "least" to -- less --.

Column 3, line 65, change "concentrated" to -- concentrate --, and "of" to -- or --.

Column 4, line 16, change "in" to -- is --.

Column 5, line 8, change "tnrough" to -- through --.

Column 6, line 13, change "kn/m" to -- kN/m --.
Column 6, line 39, change "20°" to -- 200° --.

Column 9, line 4, change "KN/m" to -- kN/m -- (both occurrences).

In the Claims

Column 9, line 22, change "baseed" to -- based --.

Column 10, lines 38,39, change "electromeric" to -- elastomeric --.
Column 10, lines 48,49, change "pentaerythritoltetrathiolgylycolate" to -- pentaerythritoltetrathiolglycolate --.
Column 10, lines 51,52, change "trimethylolpropanetris" to -- trimethylolpropanetri --.
Column 10, line 58, change "achieve" to -- adhesive --.

UNITED STATES PATENT AND TRADEMARK OFFICE
CERTIFICATE OF CORRECTION

PATENT NO. : 4,820,746
DATED : April 11, 1989
INVENTOR(S) : C.S. Rice; Y. Sasaki; S.S. Plamthottam It is certified that error appears in the above-identified patent and that said Letters Patent is hereby corrected as shown below:

Column 10, line 66, change "a" to -- A --.

Column 11, line 51, change "comprising" to -- comprises --.

Column 13, line 4, change "photoiniator" to
 -- photoinitiator --.

Signed and Sealed this

Thirteenth Day of February, 1990

Attest:

JEFFREY M. SAMUELS

Attesting Officer

Acting Commissioner of Patents and Trademarks